INVENTOR
Leon H. Hall
BY
ATTORNEY

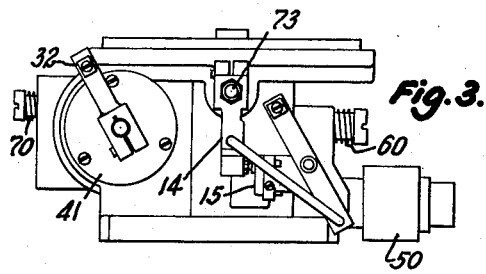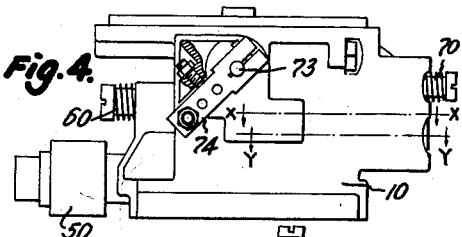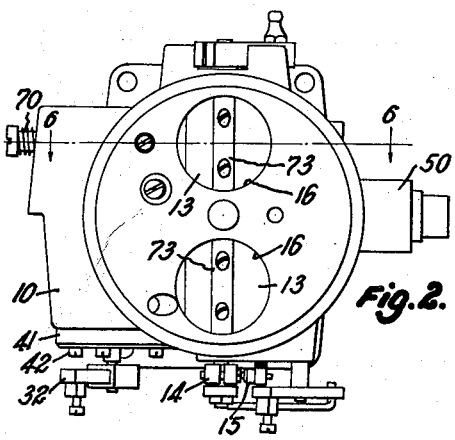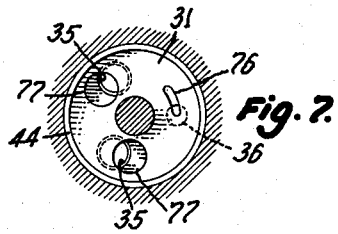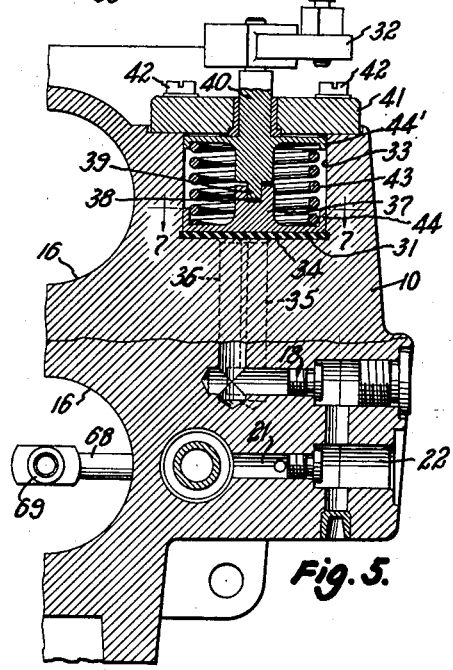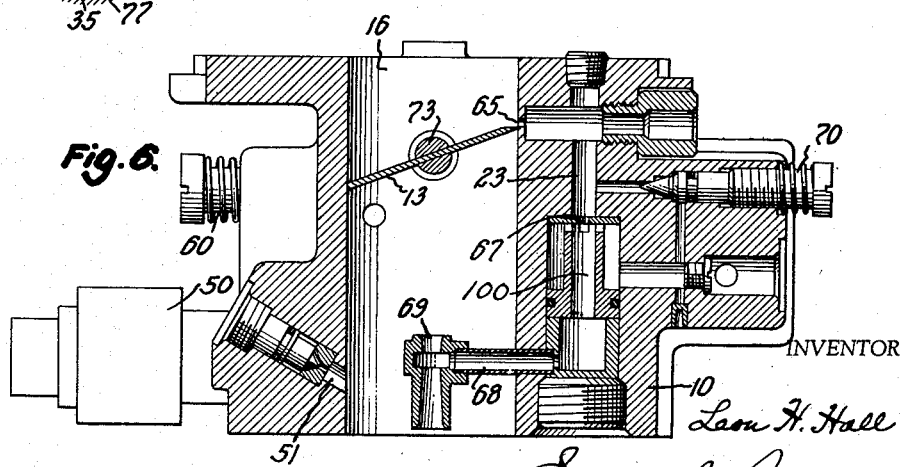

March 17, 1964 L. H. HALL 3,125,084
FUEL INJECTION SYSTEM
Filed Jan. 19, 1962 5 Sheets-Sheet 4

INVENTOR
Leon H. Hall
BY Edwin E. Greigg
ATTORNEY

March 17, 1964  L. H. HALL  3,125,084
FUEL INJECTION SYSTEM
Filed Jan. 19, 1962  5 Sheets-Sheet 5

INVENTOR
Leon H. Hall
BY Edwin E. Greigg
ATTORNEY 3,125,084
FUEL INJECTION SYSTEM
Leon H. Hall, South Burlington, Vt., assignor to Simmonds Precision Products, Inc., Tarrytown, N.Y., a corporation of New York
Filed Jan. 19, 1962, Ser. No. 167,234
9 Claims. (Cl. 123—119)

The present invention relates to a fuel injection system and, more particularly, to a method and means for controlling fuel injection mechanisms in accordance with the various engine operating conditions.

It is common practice in gasoline fuel injected engines to control fuel injection pumps by engine intake manifold pressure to supply an injected quantity of fuel proportional to the engine load. Metering systems of this type are satisfactory for most engine operating conditions, but are not adequate to meet certain other operating conditions. The operating conditions that this type of metering system will not properly meet are cold engine operation, idle, engine starting and high speed operation where the engine volumetric efficiency decreases.

Accordingly, the principal object of this invention is to provide an entirely new concept in fuel injection systems.

A further object is to provide an air bleed valve to bias the normal manifold pressure utilized to control the fuel injection pump to thereby make calibration of the system easier.

Another object is to provide a manually controlled air bleed valve for cold enrichment.

Still another object is the provision of a microswitch on the throttle body which functions as one of the controlling means for the cut-off in the fuel injection pump.

Still another object is to provide an improved idle mixture adjustment for controlling both enrichment and lean-out of engine operating conditions.

Another object is to provide supplemental priming fuel during engine cranking.

Still another object of the invention is to provide a volumetric efficiency compensation device comprising a boost venturi in the bore of the throttle body and which extends into the air stream below the throttle plate.

The details of the invention, as well as additional objects and advantages, will be clearly understood with reference to a preferred embodiment illustrated in the accompanying drawings employing similar reference numerals to identify the same elements in each of the several views, and in which:

FIG. 2 is a top plan view of the throttle body;

FIG. 3 is a left side elevational view of the throttle body showing the micro-switch and the lever for operating the air bias valve;

FIG. 4 is a right side elevational view of the throttle body;

FIG. 5 is a dual sectional view of FIG. 4, the upper section being on line X—X and the lower section being on line Y—Y thereof;

FIG. 6 is a cross-sectional view of the throttle body on line 6—6 of FIG. 2;

FIG. 7 is a section on line 7—7 of FIG. 5;

Figure 1:
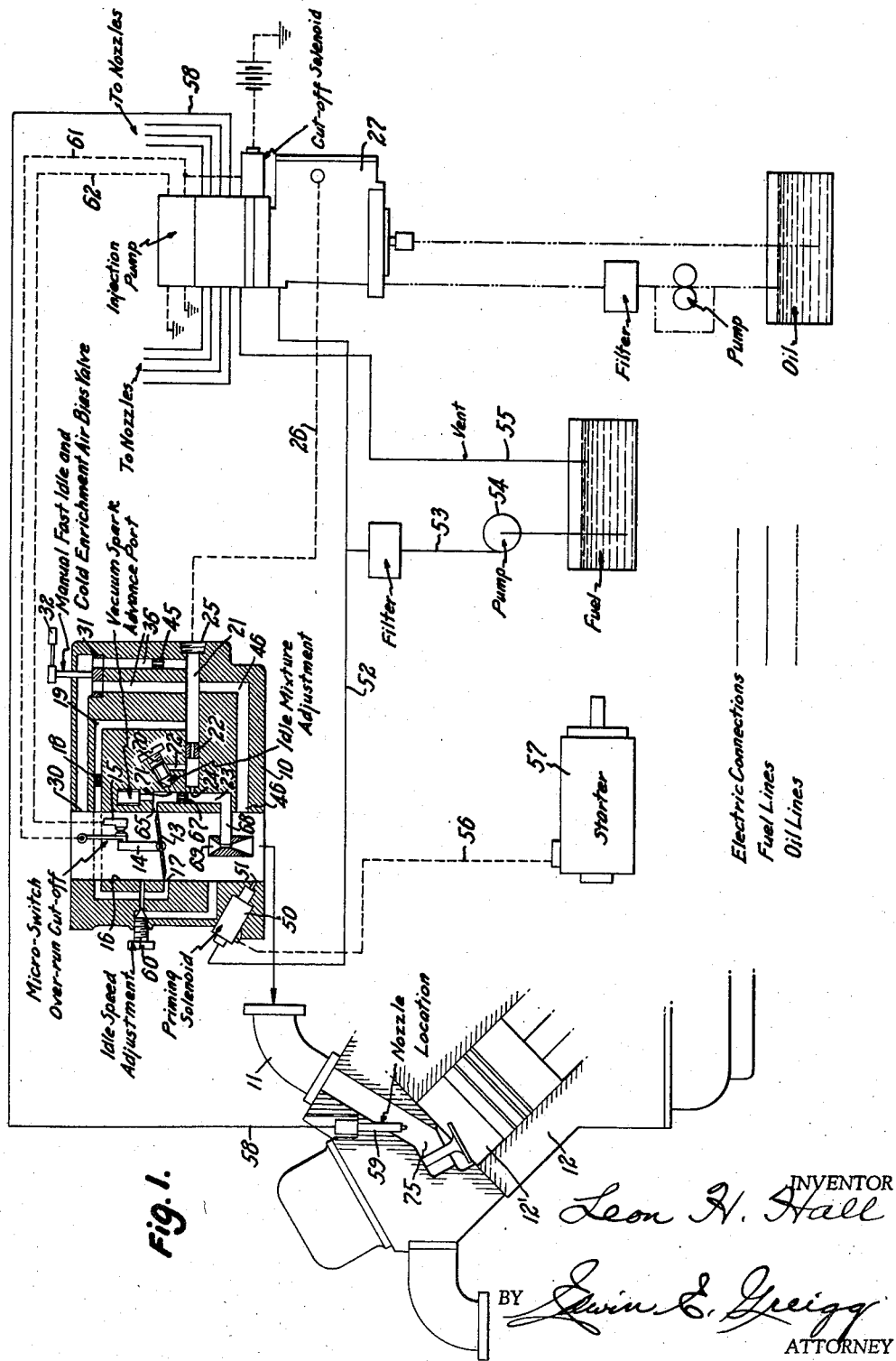
FIG. 1 is a schematic diagram of a fuel injection system embodying my invention.

In FIG. 1, there is shown a schematic diagram of a fuel injection system. The throttle body, generally indicated at 10, is adapted to be mounted on the intake manifold 11 of a conventional engine generally depicted at 12 as in the manner of a carburetor. The intake manifold is connected to the intake tubes 11 leading to the individual cylinders 12'. Atmospheric air is drawn downwardly into the manifold through the bore 16 provided in the throttle body and past butterfly valve 13. Butterfly valve 13 controls the quantity of air admitted to the manifold and thereby the absolute intake manifold pressure. Butterfly valve 13 is actuated by the accelerator pedal through a connection to lever 74 (FIG. 4) and shaft 73.

Beneath the throttle valve 13 on the suction side of the manifold there is shown a slit-like air bleed port 17 through which atmospheric air can flow from the bore 16 and thence into duct 19 when the throttle plate is moved away from its idle position. A removable restrictor 18 is positioned in passageway 19. Passageway or branch 19 intersects branch 20 and the latter communicates with conduit 21. As indicated, a removable restrictor 22 is positioned in conduit 21 with the portion of the conduit shown to the left therebeyond being arranged to intersect another passageway 23, as at 24, the opposite extent of conduit 21 communicating with a threaded bore as at 25 in the throttle body 10. When the throttle blade 13 is opened, manifold pressure will exist in passageway 65, as well as passageways 23 and 68, and all the way to restrictor 22. At high speeds the pressure in passage 68 may be slightly below manifold pressure, but for the purpose of this description, it may be assumed that manifold pressure exists in all the passages mentioned. Atmospheric air is bled through slot 17 via restrictor 18, then through passageway 19 to the communicating passageway 21. Passageway 21 is connected to the metering system of the injection pump by port 25 and the pressure line 26 of the capsule chamber (not shown). This air bleed serves to raise the pressure in passageway 21 and thereby that in the capsule chamber of the injection pump, to a value above manifold pressure. The air bleed causes no increase in capsule pressure at wide open throttle because the manifold pressure equals atmospheric pressure and no pressure differential exists to cause the air bleed to function. To increase the capsule chamber pressure in the injection pump will likewise increase the output thereof above what it would deliver if the capsule chamber pressure was the same as manifold pressure. Duct 30 connects bore 16 to a manual fast idle and cold enrichment air bias valve 31 to which an operating handle 32 is attached. As best shown in FIG. 5, the throttle body 10 is suitably bored at 33 and spacedly arranged adjacent to the base of the bore there is provided an apertured rubber faced valve plate 31. Also in FIG. 5, it is to be noted that the lower extremity of the bore 33 is provided with a plurality apertured wear plate 34 through which valve 31 is adapted to communicate with bores 35—35 suitably provided in the throttle body 10 for a purpose that will become apparent as the description progresses. The center portion of valve 31 is provided with an upstanding neck 37 suitably slotted as at 38 and thereby adapted to receive a projection 39 carried by the stub shaft 40 which extends through a cover plate 41 that is fastened to the throttle body 10 by screws 42. As shown, the spring 43 of the valve assembly is confined annularly at one end by the downwardly extending flange 44 of the valve 31 and at the opposite end by the flange 44' formed as an integral part of the stub shaft 40.

Referring once again to FIG. 1, it will be noted that branch conduit or passageway 21 which is in communication with one of the passageways 36, and particularly that passageway which includes the removable restrictor 45, feeds air according to engine operating requirements. The other branch 35 extending away from the valve 31 interconnects with another conduit 46 and terminates at 47 in the throttle body 10 downstream of the throttle plate 13, as illustrated. As is well-known to those skilled in this art, the pressure-sensitive capsule unit which is formed as a part of the injection pump 27 contains the usual sealed capsule units. For better understanding of the switch combination with the injection pump, reference is made to application Serial No. 183,872 in the name of Leon H. Hall, filed March 30, 1962, entitled Fuel Injection System.

The flow-through branch 36 provided with the variable restrictor 46 is included principally for cold enrichment purposes and because of its association with the capsule chamber of the fuel injection pump will augment pressure therein and, consequently, increase the fuel flow.

With further reference to FIG. 1, there is shown a normally closed electrical priming solenoid 50 provided with a nozzle 51 that is supplied with fuel through a priming line 52 which extends from the electric fuel supply pump 54 via line 53.

Positive fuel pressure is maintained in line 53 by the operation of an electric fuel supply pump 54 which also supplies fuel to the injector pump 27 as is well-known, overflow from the injection pump 27 being returned to the tank through vent line 55. An electrical lead 56 extending from the solenoid valve 50 is connected to a starter 57 of the engine and is, therefore, actuated simultaneously with the operation of the starter. In this manner, during normal engine cranking priming fuel is added directly to the intake manifold through priming line 52 and nozzle 51 to supplement the fuel from the fuel injection pump which is being supplied through line 58 to the injection nozzle 59 positioned in intake port 75. The priming nozzle 51 provides suitable adjustment for the rate of priming fuel by varying a restrictor in nozzle 51.

It is known that an engine, whether warm or cold, requires additional priming fuel during cranking over and above that that can be supplied by the injectors even when they are caused to deliver an amount equivalent to wide open throttle operation. Accordingly, the system described thus far has been found to be adequate to supplement the injectors during cranking to provide dependable engine starts.

Further, with regard to the diagrammatical illustration of FIG. 1, the throttle body 10, as previously described, includes the bore 16 for entrance of atmospheric air to the intake port. Adjacent to the top of the throttle body and in the area indicated at 15 (mounted exteriorly of body, see FIG. 3), there is shown the micro-switch assembly which functions as an overrun cut-off and is arranged to close only when the throttle 13 is in its fully closed position, such as shown in FIG. 1, thus de-activating through the electrical connections 61 and 62 the centrifugal switches included as a complemental part of the fuel injection pump.

The fuel injection pump provided with the electrically actuated centrifugal switches forms the basis of a co-pending application filed concurrently herewith.

From a further examination of the schematic showing in FIG. 1 and FIG. 6, it is to be noted that when the throttle plate 13 is closed, its upper edge, to the right as seen in the drawing, is positioned adjacent to a slit-like inlet port 65 which leads to the passageway 23 provided with a removable restrictor 67. With this arrangement it is believed to be manifest that during idling, air will pass through the inlet port 65, through passage 23 and restrictor 67, through the continuation of this passageway and thence to an interconnecting branch leading to the boost venturi 69 which extends out into the air stream in the manifold pressure side of the bore of throttle body 10 and below the throttle plate 13. Thus, with the pressure in branch 68 under the influence of pressure from orifice 67 and being connected thereto, as shown, its pressure is lower than the pressure within the conduit 36 which leads to the capsule chamber since it is downstream of the restrictor 18.

In the light of the detailed description set forth hereinbefore, the following summary emphasizes the most important features of this invention.

Volumetric Efficiency Compensation

Figure 8:
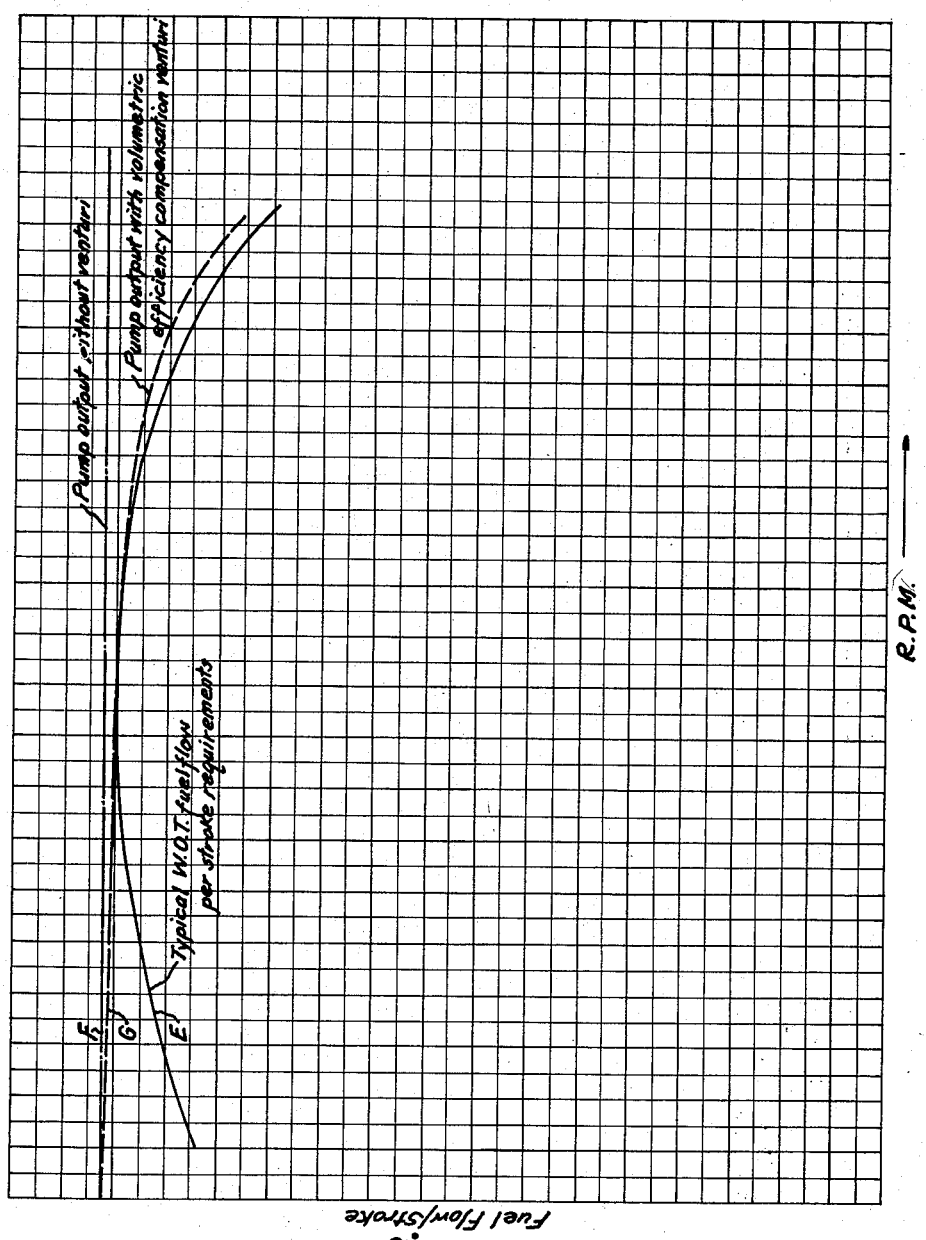
FIG. 8 is a graph showing the volumetric efficiency compensation curve.

In FIG. 8 there is shown a graph relating to the volumetric efficiency conditions of an engine. For a constant manifold pressure, such as at wide open throttle, the amount of the air that the engine will consume per stroke will vary according to the speed of the engine. This is caused by changes in volumetric efficiency due to various valve timing and/or a ram induction intake manifold. Also, at higher engine speed there is inadequate time for the cylinder of the engine to be completely charged. Thus, the air flow per stroke of the piston within the cylinder will then follow a curve with substantially the same shape as the curve E which is indicated as "typical WOT fuel flow per stroke requirements." To maintain a constant fuel-air ratio, the fuel flow per piston stroke must follow a curve of the same contour as the air flow curve. When the manifold pressure is constant, this condition being illustrated by the substantially horizontal line F, the fuel injection pump will deliver a constant amount of fuel per stroke. In FIG. 8, the substantially horizontal line F is denoted as "pump output without venturi." Thus, it will be apparent to those skilled in this art that upon comparing the two calibrated curves E and F, at low and at high r.p.m.'s the pump will be delivering too much fuel per air consumed. At low r.p.m.'s this is not serious because it is normally only a transient condition and not a steady state operating condition for long periods of time. Obviously, however, at high speeds the result is more serious for economy reasons.

In accordance with the teachings of this invention, the inclusion of venturi 69 within the bore of the throttle body 10 is a method of accomplishing the result shown by the curve G and labeled "Pump output with volumetric efficiency compensation venturi." At wide open throttle, the air velocity in the bore 16 of the throttle body 10 is proportional to engine r.p.m. By inserting the venturi 69 into the bore of the throttle body a depression will exist at the throat of the venturi and hence in the conduit 68 and line 26 which leads to the capsule chamber in the fuel injection pump 27. With increasing r.p.m.'s and therefore increased air velocity, the depression will become greater. This reduced pressure will lean-out fuel injection pump 27 as shown by curve G. It will be seen that fuel consumption drops off in substantial approximation to the engine air flow shown by curve E.

Calibration Air Bleed

Figure 9:
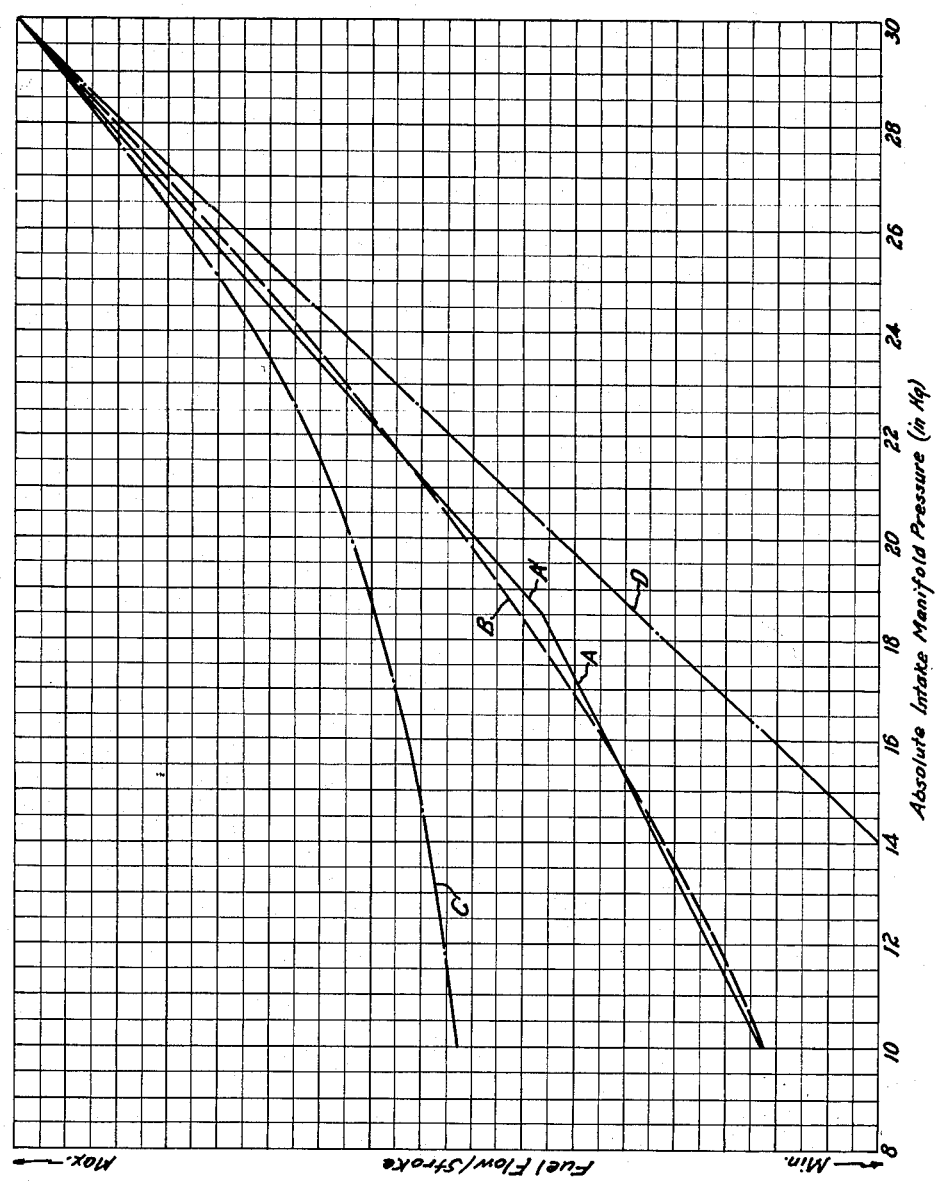
FIG. 9 is a graph showing manifold air pressure as related to fuel flow.
Figure 10:
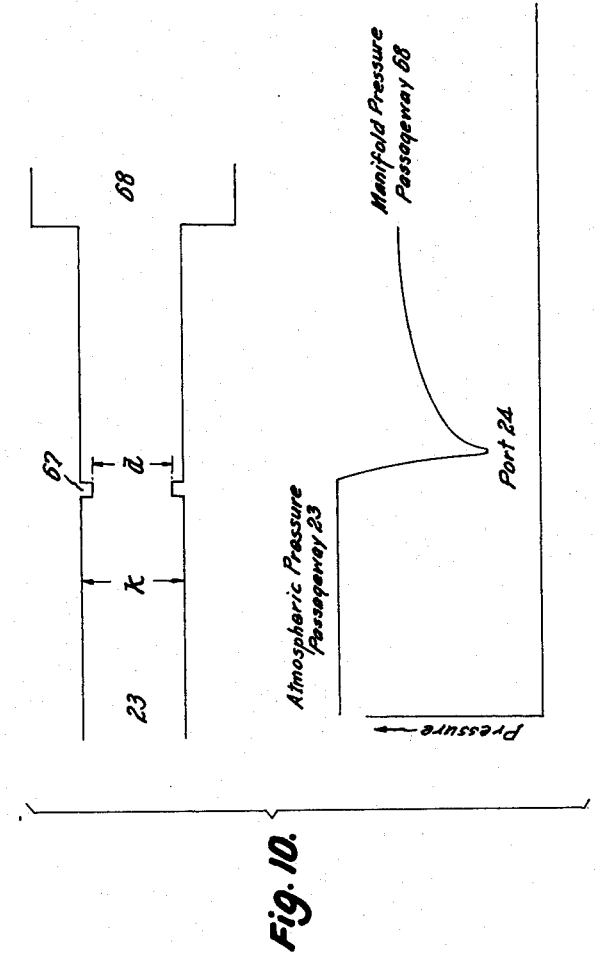
FIG. 10 illustrates a pressure curve resultant from distribution through an orifice.

FIG. 9 illustrates the effect of air bleeds in the throttle body 10. As indicated in this figure, 30 in. Hg absolute intake manifold pressure is approximately sea level atmospheric pressure. All other manifold pressures shown on the curve are below atmospheric pressure. Therefore, a vacuum exists in the intake manifold. This is indicative of part throttle engine operation.

On the graph of FIG. 9 is shown a solid line A which extends upwardly toward the center of the sheet and there intersects another solid line A' that also extends upwardly but at an increased angle relative to line A. These intersecting lines A and A' will be referred to hereinafter as a "two slope curve." The "two slope curve" is a condition which normally results from the incorporation into the conventional fuel injection pump of two tuning springs. These tuning springs usually are concentrically disposed one within the other and arranged to surround the customary drive shaft of the fuel injection pump and normally disposed to cause a balance of total force operating on the skew shaft. In this connection attention is directed to FIG. 1 of the Hossack Patent No. 2,934,053 which is owned by the assignee of the present application. Further, with regard to FIG. 9, the solid line A of the "two slope curve" indicates the functioning of an engine at lower power cruising conditions whereas solid line A' of this curve shows functioning of the engine at high power operating conditions. To accomplish the resultant condition indicated, it has been necessary in a calibration curve of the type shown in A—A' to shim one of the springs previously described to obtain the "knee" effect in the "two slope curve" at the proper position. Further, with regard to FIG. 9, to obtain the curve shown at B which very closely approximates A—A', an air bleed is used. This air bleed will not function with closed throttle such as shown in FIG. 1. For the air bleed to function properly, the throttle blade 13 must be opened sufficiently to allow port 17 to be exposed to atmospheric pressure and port 65 to be exposed to intake manifold pressure. Ports 17 and 65 are actually relatively narrow slots so that they are uncovered with a minimum angular travel of throttle blade 13. Thus, as previously mentioned, when the throttle blade 13 is opened, manifold pressure will exist in passageways 65, 23 and 68 and therethrough to restrictor 22. Atmospheric air is bled through slot 17 via passage 30 to restrictor 18, then through passageway 19 to passageway 21. Passageway 21 is connected to the metering system of the injection pump by port 25 and capsule pressure line 26. This air bleed serves to raise the pressure in passageway 21, and also that in the capsule chamber of the injection pump to a value above manifold pressure. The air bleed causes no increase in capsule pressure at wide open throttle because the manifold pressure equals atmospheric pressure and no pressure differential exists to cause the air bleed to function. Thus, it will be seen that this arrangement provides a very versatile means of calibrating the fuel injection system. Practically any combination of curve or straight line can be had by selecting the proper single slope and restrictor size.

Cold Enrichment Air Bleed

The effect of the cold enrichment air bleed is shown as the curve C on FIG. 9. Atmospheric air is bleed through passageway 30 through valve 31 via the passageways 36 to restrictor 45 and then to passageway 21. Passageway 21 is connected to the capsule chamber of the pump as previously described. Valve 31 is manually controlled by lever 32 and is depicted in partially open position in FIG. 7. When the engine is at its normal warm operating condition, valve 31 is closed providing no enrichment. To provide for variable amount of air bleed and hence enrichment, slot 76 is arranged as shown in FIG. 7. As valve 31 is rotated in a clockwise direction by lever 32, slot 76 uncovers an increasing amount of aperture 36 (FIG. 7) thereby increasing the effective area and the amount of enrichment. Passageway 30 is located so that it is exposed to atmospheric pressure regardless of the position of throttle blade 13. It is therefore effective, unlike the calibration air bleed, even at closed throttle.

Fast Idle

During cold operation the normal friction drag in an engine is much greater than when the engine is warm. It is therefore necessary to supply the engine with additional air to make it idle properly. To accomplish this is the second function of valve 31. Passageways 35—35 in the throttle body 10, as best shown in FIG. 7, converge into one conduit. Passageway 35 is connected to passageway 46 that terminates in bore 16 below the throttle plate 13. The apertures 77 in valve 31 are arranged to uncover the passageways 35—35 to increase the area of this portion of valve 31 as it is rotated clockwise by lever 32. As the effective area is increased, more air can flow from passageway 30, through valve 31 and passageway 35, to the engine. Thus, the fast idle control and cold enrichment air bleed are incorporated into one valve so that they will work in unison with only one control means, that is, lever 32 which is normally operated by a Bowden wire control from the vehicle dash board (not shown).

Idle Speed Adjustment

The idle speed of the engine is controlled by screw 60 which together with its associated passageways are arranged so that air can be bled around the throttle blade 13 to control air flow to the engine during idle.

Idle Mixture Adjustment

During idle, throttle plate 13 is closed and port 65 is open to atmospheric pressure. Passageway 68 is at manifold pressure because there is no depression in the venturi 69 due to the low air velocity at idle. Since port 65 and passageway 23 are at atmospheric pressure and passageway 68 is considerably below atmospheric pressure (10–12 in. Hg absolute), air will flow past orifice 67. To operate in this manner it is assumed that needle valve 70 is completely closed. It will be understood that the pressure in the vicinity of port 24, immediately downstream of orifice 67, is considerably below manifold pressure. When manifold pressure is of the order of 10–12 in. Hg absolute, the pressure in port 24 is approximately 4–5 in. Hg absolute. The increase in pressure from port 24 to passageway 68 is termed "pressure recovery." The amount of pressure recovery, and hence the amount of lean-out available, is dependent upon the physical configuration of passageway 100 and also that of orifice 67. To get optimum results the $d/K$ ratio of the orifice should be approximately 0.8 and the distance from the orifice to passageway 68 should be approximately 3.5 K.

The low pressure at port 24 allows the injection pump to be leaned-out more than is actually required. To provide for idle mixture adjustment needle valve 70 is opened thereby bleeding atmospheric air from passageway 23 to passageway 72. This has the effect of raising the pressure at port 24. The more needle valve 70 is opened, the more the pressure at port 24 is increased. This pressure can be increased to a value equal to manifold pressure or even greater, if required.

It is also to be understood that it is preferable to make the normal calibration air bleed ineffective at idle. If port 17 was open to atmosphere at idle, air would flow into passageway 21. This would have essentially the same effect as opening needle valve 70 and would thereby nullify the effect of the low pressure area at port 24.

When throttle blade 13 is opened enough to expose the slit-like port 17 to atmospheric pressure and port 65 to manifold pressure, the idle mixture adjustment becomes ineffective and the fuel injection pump 27 operates on its normal calibration curve as previously explained under the title "Calibration Air Bleed."

Overrun Cut-Off Micro-Switch

Suitably secured to the exterior of the throttle body is a micro-switch assembly 15, the operating contact portion of which is arranged to be contacted by lever 14. Lever 14 is attached to shaft 73 so that it rotates when throttle blade 13 is opened. Micro-switch 15 is mounted in such a manner that when throttle blade 13 is closed, lever 14 closes the contacts. Thus, when the throttle blade 13 is closed, as shown in FIG. 1, and the micro-switch contacts are closed, the centrifugal switch is closed and the solenoid is actuated, thus preventing further operation of the fuel pump 27.

Although but one embodiment of the invention has been depicted and described, it will be apparent that this embodiment is illustrative in nature and that a number of modifications in the apparatus and variations in its end use may be effected without departing from the spirit or scope of the invention as defined in the appended claims.

I claim:

1. In a fuel injection system for an internal combustion engine adapted to provide a flow of fuel to the engine in one stream and a flow of air to the engine in a separate stream, means for measuring the flow of air in the air stream, said means including a throttle body provided with a bore therethrough, said bore being associated with intercommunicating passageways for sensing conditions of atmospheric and manifold air, means for metering the flow of fuel in the fuel stream, and a connection between said means adapted to maintain the flow of fuel proportional to the flow of air, said connection including an engine responsive means for changing the phase of the fuel metering means relative to the air measuring means thereby to change the proportion of fuel flow to air flow.

2. In a fuel injection system as claimed in claim 1, wherein said throttle body is provided with a manually operated cold enrichment air bias valve, said valve providing a means whereby the fuel metering means will increase fuel flow to said engine.

3. In a fuel injection system as claimed in claim 2, wherein the manually operated air bias valve includes means for remotely rotating the same.

4. In a fuel injection system for an internal combustion engine adapted to provide a flow of fuel to the engine in one stream and a flow of air to the engine in a separate stream, means for measuring the flow of air in the air stream, pump means for metering the flow of fuel in the fuel stream, said pump means including electrical switch means, and a connection between said means adapted to maintain the flow of fuel proportional to the flow of air, said connection including electrical means extending between the means for measuring the flow of air and the electrical switch means carried by said pump means for changing the phase of the fuel metering means relative to the air measuring means thereby to change the proportion of fuel flow to air flow.

5. In a fuel injection system for an internal combustion engine adapted to provide a flow of fuel to the engine in one stream and a flow of air to the engine in a separate stream, means for measuring the flow of air in the air stream, pump means for metering the flow of fuel in the fuel stream, said pump means including switch means, and a connection between said means adapted to maintain the flow of fuel proportional to the flow of air, said connection including engine responsive switch actuating means for changing the phase of the fuel metering means relative to the air measuring means thereby to change the proportion of fuel flow to air flow.

6. In a fuel injection system for an internal combustion engine adapted to provide a flow of fuel to the engine in one stream, a throttle body carried by an intake manifold mounted on said engine and including an inlet bore for flow of air therethrough to the engine in a separate stream, a valve in said bore for controlling the air flow with said flow of fuel being controlled by the intake manifold air pressure, a venturi in said throttle bore beneath said valve and a passage extending from said venturi to an area above said valve, whereby said fuel flow is varied to match volumetric efficiency of said engine.

7. In a fuel injection system for an internal combustion engine adapted to provide a flow of fuel to the engine in one stream and an apertured throttle body associated with an intake manifold for passage of air to the engine in a separate stream, a throttle valve in said body for controlling said passage of air, idle mixture adjustment means carried by said body and including a restrictor for biasing the intake manifold air pressure signal, thereby providing means for varying said flow of fuel to said engine.

8. In a fuel injection system as claimed in claim 7, wherein the idle mixture adjustment means carried by said body includes an adjustable air bleed for providing a biased intake manifold air pressure signal which ranges from below the actual intake manifold air pressure of said engine for lean conditions to above the actual intake manifold air pressure of said engine for rich conditions.

9. In the fuel injection system as claimed in claim 7, wherein the throttle body is provided with at least two throttle valves and includes a variable area valve for increasing the speed of said engine.

References Cited in the file of this patent

UNITED STATES PATENTS

| | | |
|---|---|---|
| 2,915,053 | Armstrong | Dec. 1, 1959 |
| 3,005,625 | Holley | Oct. 24, 1961 |

UNITED STATES PATENT OFFICE
CERTIFICATE OF CORRECTION

Patent No. 3,125,084                              March 17, 1964

Leon H. Hall

It is hereby certified that error appears in the above numbered patent requiring correction and that the said Letters Patent should read as corrected below.

Column 2, line 52, for "plurality" read -- plurally --; column 5, line 40, for "ways" read -- way --.

Signed and sealed this 4th day of August 1964.

(SEAL)
Attest:

ERNEST W. SWIDER  
Attesting Officer

EDWARD J. BRENNER  
Commissioner of Patents